United States Patent

Garrison et al.

[15] 3,704,433

[45] Nov. 28, 1972

[54] BAND-ELIMINATION FILTER

[72] Inventors: Jedediah Lyman Garrison, Andover; Andrew Nicholas Georgiades, Lowell, both of Mass.

[73] Assignee: Bell Telephone Laboratories, Incorporated, Murray Hill, N.J.

[22] Filed: May 27, 1971

[21] Appl. No.: 147,681

Related U.S. Application Data

[63] Continuation of Ser. No. 847,544, Aug. 5, 1969, abandoned.

[52] U.S. Cl. ......................333/72, 310/8.2, 310/9.8

[51] Int. Cl. ..............................................H03h 9/00

[58] Field of Search .............333/72, 30; 310/8.2, 9.8

[56] References Cited

UNITED STATES PATENTS

| | | | |
|---|---|---|---|
| 3,585,537 | 6/1971 | Rennick et al. | 333/72 |
| 3,396,327 | 8/1968 | Nakazawa | 333/72 |
| 3,559,115 | 1/1971 | De Vries | 333/30 |
| 2,248,776 | 7/1941 | Och | 333/72 |
| 3,569,873 | 3/1971 | Beaver | 333/72 |

*Primary Examiner*—Herman Karl Saalbach
*Assistant Examiner*—Marvin Nussbaum
*Attorney*—R. J. Guenther et al.

[57] ABSTRACT

A band-elimination filter network is formed by a pair of crystal resonators each including a respective pair of electrodes sandwiching a common crystal wafer therebetween. The resonators are acoustically coupled through the common wafer and are connected externally by way of a reactive element having a magnitude within a critical range.

15 Claims, 10 Drawing Figures

INVENTORS J. L. GARRISON
A. N. GEORGIADES
BY Leo Stanger
ATTORNEY

BAND-ELIMINATION FILTER

CROSS-REFERENCE TO RELATED APPLICATION

This application is a continuation of our copending application, Ser. No. 847,544, filed Aug. 5, 1969, now abandoned.

BACKGROUND OF THE INVENTION

1. Field of the Invention

This invention relates to band-elimination filter networks and particularly to networks of this type that include piezoelectric crystal filter elements.

2. Description of the Prior Art

Band-elimination filters utilizing crystal structures generally include a complex network of various discrete circuit elements in combination with uncoupled crystal resonators. The filter disclosed by H. G. Och in FIG. 19 of his U.S. Pat. No. 2,248,776, issued July 8, 1941, is illustrative. Such crystal structures, which are sometimes called split electrode filters, typically employ a first or input pair of electrodes mounted on opposite faces of a crystal wafer to form a primary or input resonator. A secondary resonator is formed by two additional electrodes, spaced from the first set of electrodes, and positioned on opposite faces of the same crystal wafer. Because the two electrodes on one side of the wafer are often interconnected, they are sometimes deposited as a single electrode. Another example of a two-resonator, common crystal wafer filter with discrete reactive circuit elements interconnecting various ones of the electrodes is disclosed by W. P. Mason in U.S. Pat. No. 2,271,870, issued Feb. 3, 1942. Mason's filters are restricted to bandpass characteristics, however, and provide no band elimination. As in the filters shown by Och, Mason's resonators are uncoupled.

SUMMARY OF THE INVENTION

The principles of the invention rest in part on the discovery that band-elimination filter characteristics may be realized in a common-wafer, multi-resonator, monolithic crystal filter by exploiting the combination of acoustic coupling and the use of discrete reactive elements externally interconnecting the resonators. In one embodiment of the invention, a signal input is applied across a first pair of electrodes that form a primary resonator by sandwiching a portion of a piezoelectric crystal wafer therebetween. The filtered output signal is extracted from a secondary resonator that includes a second pair of electrodes sandwiching a separate and distinct portion of the common crystal wafer. In accordance with the invention, the two electrode pairs are spaced one from the other although both are mounted on the same crystal wafer. The geometries of the crystal filter, including the resonator spacing, are adjusted to ensure that the two resonators are coupled, commonly stated as acoustically coupled, so that a significant portion of the input signal energy over the desired bandwidth is transmitted acoustically, or mechanically, through the wafer, being extracted from the secondary resonator in translated electrical form.

In accordance with a key aspect of the invention, the resonators are additionally connected, in this instance externally, however, with one or more reactive elements. These elements, in combination with the equivalent reactive elements that characterize the phenomenon of acoustic coupling, cause signal cancellation near the resonant frequencies of the resonators thus producing the desired band elimination. This combination is, of course, to be contrasted with those prior art filters that achieve band elimination through complex discrete element networks, with or without uncoupled crystal resonators.

A band-elimination filter in accordance with the invention may also be viewed simply as a network, the crystal itself contributing coupling means in the form of an impedance inverter. Phase is controlled through the use of the external reactive connection. Additionally, by reversing the terminals of one of the crystal ports, either inductive or capacitive external connecting elements may be employed.

In accordance with an important feature of the invention, clear-cut band-elimination characteristics are achieved in a filter employing the described structure only when the reactance of the discrete element coupling device falls within a specified range of a critical value. The critical value may be defined as $K\sqrt{X_1X_2}$, where K is the coefficient of coupling between the resonators and $X_1$ and $X_2$ are the absolute values of the respective reactances of the equivalent motional capacitances or inductances of each of the respective resonators. Thus, if the resonators are identical, the critical value of the reactance is $KX_1$ or $KX_2$. The closer that the value of the actual coupling is to the critical value, the narrower and deeper is the band that the filter eliminates. Conversely, the further the value of the external coupling reactance is removed from the critical value, the wider but the less pronounced is the band eliminated.

In accordance with the invention, one suitable range for the external coupling has been found to be $K\sqrt{X_1X_2}\pm20\%$. For a moderately narrow band and for a very limited band, the ranges of $K\sqrt{X_1X_2}\pm 10\%$ and $K\sqrt{X_1X_2}\pm 2\%$, respectively, have been found to be effective.

In one embodiment of the invention a capacitor $C_x$ connects an electrode of the primary resonator to an electrode of the secondary resonator on the opposite face of the crystal wafer. The other electrodes of the two resonators are connected to a reference potential such as ground. The absolute value of $C_x$ is in the range of $\sqrt{C_1C_2/K}\pm 20\%$ where $C_1$ and $C_2$ are the equivalent motional capacitances of each of the resonators. Progressively narrower bands are achieved by fixing the value of $C_x$ in the ranges $\sqrt{C_1C_2/K}\pm$ 10% and $\sqrt{C_1C_2/K}\pm2\%$.

In another embodiment of the invention, two electrodes on one face of the wafer are connected directly and the two electrodes on the other side of the wafer are connected by an inductor. For progressively narrowing the eliminated bands, the reactance of the inductor is fixed within the ranges of $K\sqrt{L_1L_2}\pm 20\%$, $\pm10\%$ and $\pm 2\%$ where $L_1$ and $L_2$ are the equivalent motional inductances of the resonator.

DETAILED DESCRIPTION

Figure 1:
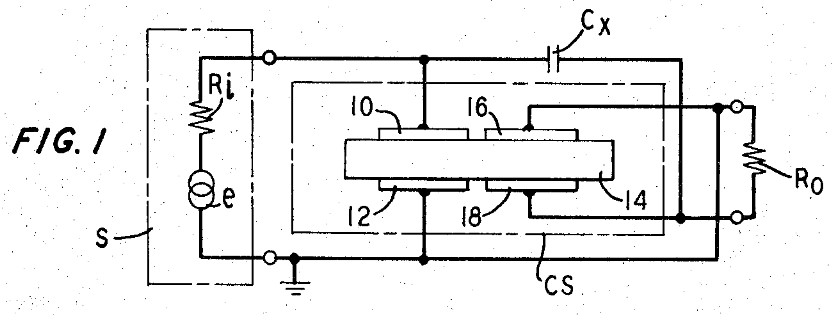
FIG. 1 is a schematic diagram illustrating a band-elimination filter embodying features of the invention and showing a two-resonator crystal filter in section.

In FIG. 1 a source S composed of a voltage $e$ and internal resistance $R_i$ supplies a high frequency potential across a pair of primary electrodes 10 and 12 mounted on a piezoelectric wafer 14 with which they form a primary resonator. The dimensions of the thicknesses of the wafer and electrodes are exaggerated for clarity. The primary electrodes 10 and 12 piezoelectrically excite the wafer 14 to produce mechanical vibrations which in turn excite electrical signals on a pair of secondary electrodes 16 and 18 spaced from the electrodes 10 and 12 on the faces of the wafer 14. The electrodes 16 and 18 and the wafer 14 form a secondary resonator which is coupled to the primary resonator by a coefficient of coupling K. The resonators have respective equivalent motional capacitances $C_1$ and $C_2$. Preferably, all the electrodes are identical. Thus, $C_1 = C_2$. The electrodes and wafer form a crystal structure CS.

The electrodes 16 and 18 apply the electrical signals across a load $R_o$ whose value preferably equals the value of $R_i$. The lower electrode of the first resonator is interconnected with the upper electrode 16 on the second resonator and grounded. A control capacitor $C_x$ applies the voltage appearing at the electrode 10 to the electrode 18 on the opposite face of the wafer 14 in the other resonator. The value of $C_x = \sqrt{C_1C_2/K}$. Since $C_1 = C_2$, $C_x = C_1/K$.

According to other embodiments of the invention $C_x$ has any value within the range $\sqrt{C_1C_2/K} \pm 20\%$. Preferably for sharper and narrower rejection bands $C_x = \sqrt{C_1C_2/K} \pm 10\%$. For still sharper and narrower bands $C_x = \sqrt{C_1C_2/K} \pm 5\%$ and $\pm 2\%$.

Figure 2:
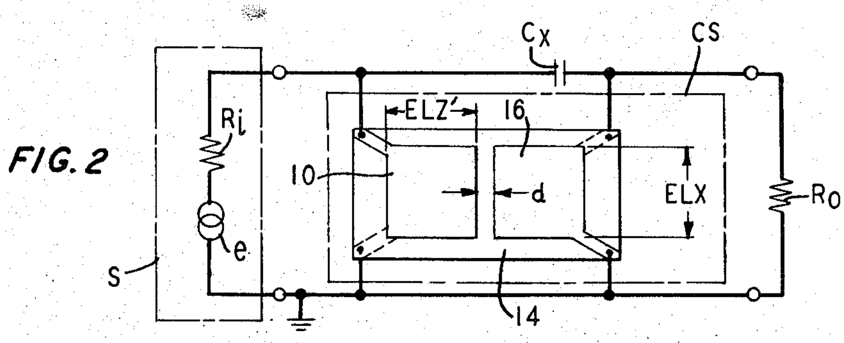
FIG. 2 is a schematic diagram showing the circuit of FIG. 1 with the two-resonator crystal structure shown in plan view.
Figure 3:
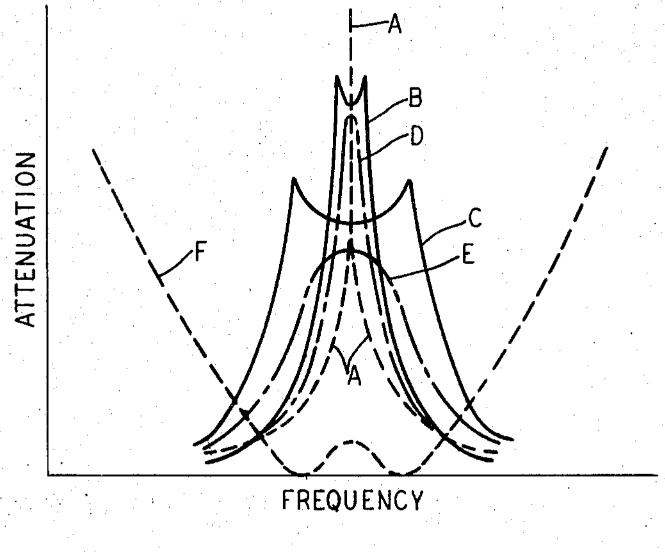
FIG. 3 is a graph illustrating the changes in attenuation with frequency for several values of a cross-connecting capacitor in FIGS. 1 and 2.

The transmission characteristic of the filter in FIGS. 1 and 2 is illustrated in FIG. 3 for three different values of $C_x$. When the value of $C_x$ is at the critical value, $\sqrt{C_1C_2/C_1K}$, the transmission characteristics of the filter F between the source S and the load $R_o$ appears as shown by the curve A in FIG. 3 with a single peak. At $C_x = \sqrt{C_1C_2/K} + 2\%$ the band broadens and two peaks appear. As the value $C_x$ increases to $\sqrt{C_1C_2/K} + 5\%$, the characteristic assumes the shape of characteristic B which also exhibits two sharp attenuation peaks. At $C_x = \sqrt{C_1C_2/K} + 10\%$ the curve has the shape illustrated as C. At $C_x = \sqrt{C_1C_2/K} - 5\%$ transmission characteristic appears in curve D. At $C_x = \sqrt{C_1C_2/K} - 10\%$ the transmission characteristic appears as in curve E. Beyond $C_x = \sqrt{C_1C_2/K} - 25\%$ the transmission characteristic degrades to a passband characteristic shown in curve F.

Figure 4:
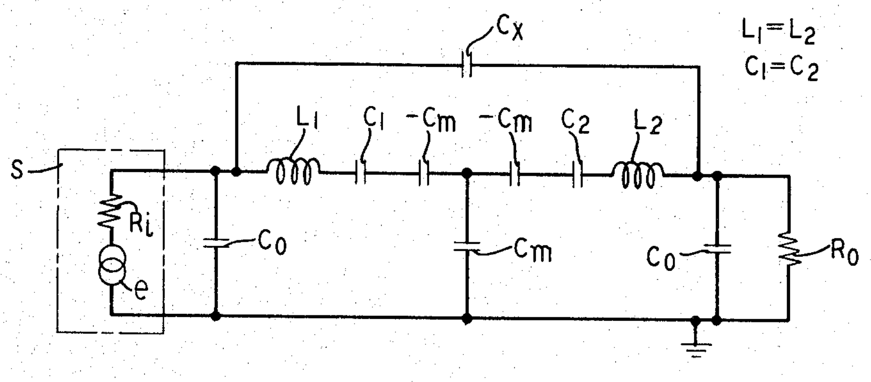
FIG. 4 is a circuit diagram illustrating an equivalent circuit for the networks of FIGS. 1 and 2.

The operation of the band-elimination filter becomes evident from considering FIG. 4 which illustrates the ladder equivalent circuit of FIGS. 1 and 2. Here, the series resonant circuits formed by the inductors $L_1$, $L_2$ and capacitors $C_1$, $C_2$ represent the resonators formed by the pairs of electrodes 10 and 12, and 16 and 18, with the wafer 14 if these resonators were uncoupled and did not interact. The Tee circuit formed by the crossarm series capacitors $-C_m$ and the upright shunt capacitor $C_m$ constitutes a coupling network that represents the coupling and phase shift between the cross-connected resonators formed of electrodes 10 and 12 and the resonator formed of electrodes 16 and 18. The values of $C_m$ are derived from the general relations set forth in *Electronic & Radio Engineering*, by Terman, published 1955 by the McGraw Hill Book Company, on pages 19–21. Terman shows that the coefficient of coupling $K$ between the primary resonator and the secondary resonator is $K = X_m/\sqrt{X_1X_2}$, where $X_1 = 1/\omega_oC_1 = \omega_oL_1$ $X_2 = 1/\omega_oC_2 = \omega_oL_2$ $X_m = 1/\omega_oC_m$.

Thus $>K = \sqrt{C_1C_2/C_m}$ and $C_m = \sqrt{C_1C_2/K}$.

The value $C_m$ is the critical value of $C_x$ which gives the sharpest peak.

Figure 5:
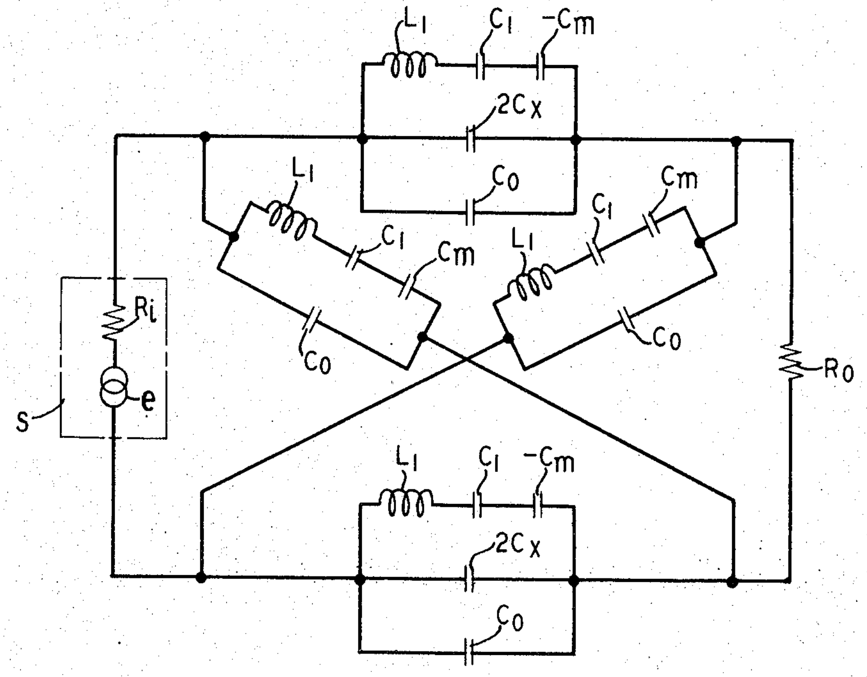
FIG. 5 is a schematic diagram illustrating another equivalent circuit for the circuits of FIGS. 1, 2 and 4.
Figure 6:
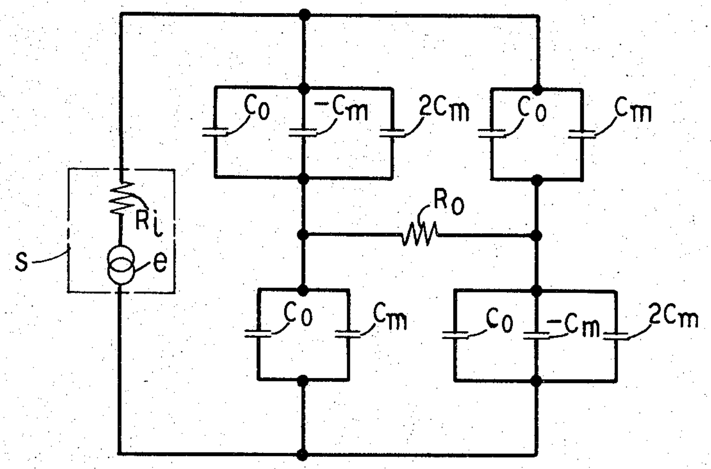
FIG. 6 is a schematic diagram illustrating an equivalent circuit of the circuit in FIG. 5.

Since the electrodes 10, 12 and 16, 18 are identical, $L_1 = L_2$ and $C_1 = C_2$. Bartlett's bisection theorem may then be used to obtain the lattice equivalent network for the ladder of FIG. 4. This appears in FIG. 5. Here, at the center frequency, when $\omega_oL_1 - 1/\omega_oC_1 = 0$, and when $C_x$ is equal to the value $C_m = C_1/K$, the network of FIG. 5 simplifies to the bridge network of FIG. 6. In each arm of the bridge the value $C_o$ is parallel with a value $C_m$, or a value $2C_m - C_m$. Since $2C_m - C_m$ equals $C_m$, each of the arms in the bridge is identical and the voltage across $R_o$ is equal to zero. This indicates that when $C_x$ is equal to $C_m = C_1/K$, an attenuation peak exists in the passband.

When $C_x$ exceeds $C_m$, i.e., exceeds $C_1/K$, two peaks occur. The location of these peaks can be computed by solving for the mesh equations in FIG. 4. A solution to these mesh equations indicates that the current through $R_o$ is zero at a frequency displacement $\Delta\omega$ from a center frequency $\omega_0$ when $$\frac{\Delta\omega}{\omega_0} = \pm\frac{1}{2}\frac{C_1}{C_m}\sqrt{1-\frac{C_m}{C_x}}$$

An example of dimensions suitable for a filter embodying features of the invention follow. These dimensions are given only as an example and are not limiting.

Wafer material = Quartz crystal

Wafer thickness = $9.3591484 \times 10^{-3}$ inches

Wafer dimensions = $5.2452996 \times 10^{-1}$ inch diameter

Electrode dimensions = $1.4038723 \times 10^{-1}$ inch wide (ELX — FIG. 2)

Electrode dimensions = $1.1230978 \times 10^{-1}$ inch long (ELZ — FIG. 2)
Distance between electrodes = $2.0474192 \times 10^{-2}$ inch (D — FIG. 2)
Plateback = 2 percent
$C_1 = 9.9824842 \times 10^{-15}$ Farads
$K = 1.4161971 \times 10^{-3}$
$L_1 = 5.1808135 \times 10^{-2}$ Henries
$f_A = 6.995100$ MHZ
$f_B = 7.004900$ MHZ
$C_m = 7.0487961 \times 10^{-12}$ Farads
$C_x = 7.0487961 \times 10^{-12}$ Farads.

Figure 7:
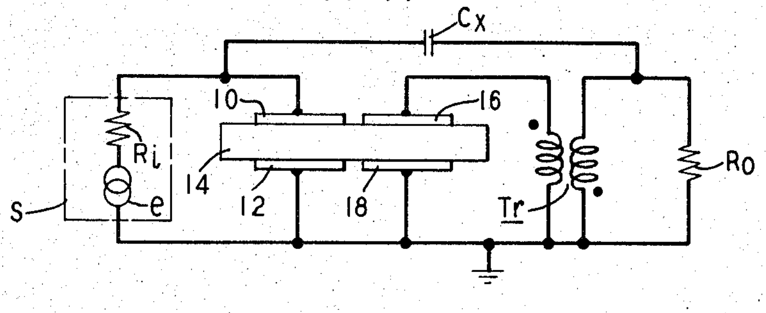
FIG. 7 is a schematic diagram of another band-elimination filter embodying features of the invention.

The invention may also be embodied as shown in FIG. 7. Here, the crystal structure CS is substantially identical to that shown in FIG. 1. The phase reversal accomplished by reverse poling of the electrodes 16 and 18 of FIG. 1 is accomplished by a 1:—1 transformer Tr. The resulting operation is substantially identical to that of FIG. 1 except for limitations that might be imposed by the transformer.

Figure 8:
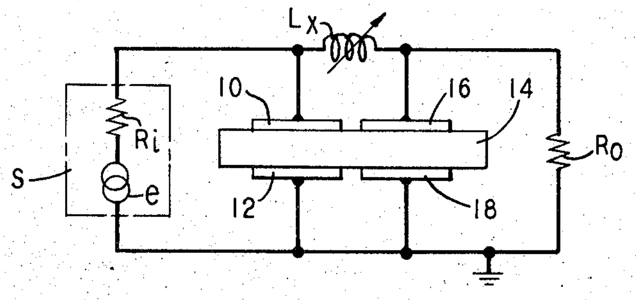
FIG. 8 is a schematic diagram of still another band-elimination filter embodying features of the invention.
Figure 9:
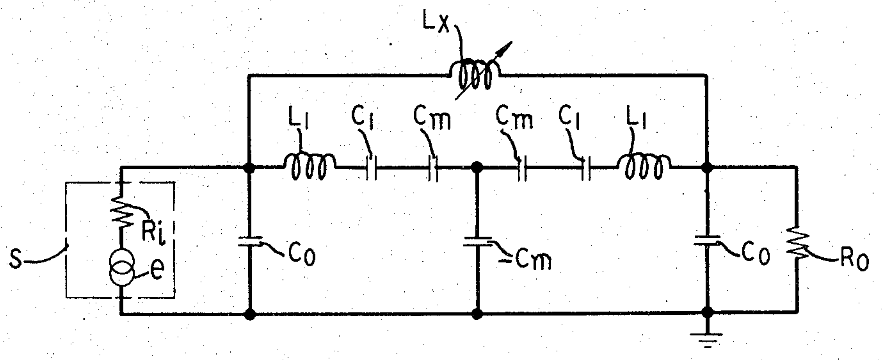
FIG. 9 is a schematic diagram illustrating an equivalent circuit for the circuit of FIG. 8.

FIG. 8 illustrates still another embodiment of the invention. Here, the crystal structure CS of FIG. 1 is excited by a source S and energizes a load $R_0$. However, here the structure CS is normally poled. An inductor $L_x$ passes energy from the electrode 10 of one resonator on one face of the wafer 14 to the electrode 16 on the same face of the wafer 14 on the second resonator. According to one embodiment of the invention, the inductor $L_x$ has a reactance equal to the reactance of $C_m$ at the center frequency $1/(2\pi\sqrt{L_1C_1}$. Thus $L_x = K\sqrt{L_1L_2}$. According to one embodiment of the invention $L_x$ has any value within the range $K\sqrt{L_1L_2} \pm 20\%$. For sharper bands, $L_x = K\sqrt{L_1L_2} \pm 10\%$. For even sharper bands $L_x = K\sqrt{L_1L_2} \pm 2\%$. The response of a filter as shown in FIG. 9 corresponds to that of FIG. 1 and appears as shown in FIG. 3. The curves A to E represent responses for the values of $L_x = K\sqrt{L_1L_2}$, $K\sqrt{L_1L_2} + 5\%$, $K\sqrt{L_1L_2} + 10\%$, $K\sqrt{L_1L_2} - 5\%$, and $K\sqrt{L_1L_2} - 10\%$, respectively. The curve $F$ represents the response when $L_x$ is further from $K\sqrt{L_1L_2}$ than 25 percent.

The operation of the circuit of FIG. 8 can be understood by referring to the equivalent circuit in FIG. 9. This circuit is substantially identical to that of FIG. 4 except that the inductor $L_x$ replaces the capacitor $C_x$ and the phase reversal established by the capacitive Tee circuit composed of the upright shunt capacitor $C_m$ and the series capacitors $-C_m$ is reversed. Thus, the shunt capacitor is $-C_m$ and the series capacitors are $C_m$.

Figure 10:
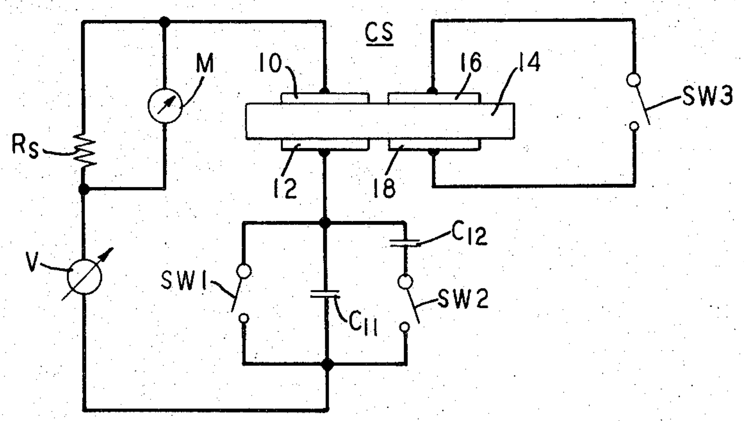
FIG. 10 is a schematic diagram illustrating a test circuit for obtaining particular values in the crystal structure of the circuits in FIGS. 1, 2, 7 and 8.

The values $C_m$, $K$, $C_1$, etc. may be obtained experimentally for a crystal structure CS with the test circuit of FIG. 10. Here, a variable-frequency frequency-calibrated voltage source V applies its potential across the electrodes 10 and 12 mounted on the wafer 14 in the crystal structure CS. A switch SW1 shorts out a capacitor $C_{11}$ to complete the connection between the electrode 12 and the source V. A voltmeter M measures the voltage appearing across the resistor $R_S$. A maximum voltage reading by the meter M indicates high current through the resistor $R_S$ and hence minimum impedance or resonance between the electrodes 10 and 12.

with the switch SW1 closed, the frequency of the source V is varied until a maximum reading is obtained at the meter M. The frequency at which the maximum occurs is noted. This maximum reading occurs at a frequency $f_s$, the series resonant frequency of the resonator formed by the electrodes 10 and 12, when this resonator is uncoupled from the resonator formed with the electrodes 16 and 18. Here $f_s = 1/(2\pi\sqrt{L_1C_1}) = 1/(2\pi\sqrt{L_2C_2})$.

The switch SW1 which shunts the capacitor $C_{11}$ is now opened to include the capacitor $C_{11}$ in the measurement. The capacitor $C_{11}$ may have a value of approximately 20 picofarads. The frequency of the source V is then varied to obtain a maximum voltage in the meter M. This occurs at a frequency $f_{C1}$. A switch SW2 is now closed to add an 80 pf capacitor $C_{12}$ across the capacitor $C_{11}$ to produce a series capacitance of 100 pf in series with the resonator formed by the electrodes 10 and 12 with the wafer 14. This third measurement then produces a frequency $f_{C2}$.

Switch SW1 is then closed. A switch SW3 then short-circuits the electrodes 16 and 18 so as to couple the resonator formed with the electrodes 16 and 18 and the resonator formed with the electrodes 10 and 12. The frequency variation of the source V then produces two maxima in the meter M. These are respectively at frequencies $f_A$ and $f_B$. These represent two separate resonant frequencies resulting from the coupling between the two resonators of the crystal structures CS. The value $f_A$ may be obtained also by varying the frequency of source V with switch SW1 closed and switches SW4 and SW2 open, while connecting electrode 16 to electrode 10 and connecting electrodes 18 to electrode 12. The value $f_B$ is obtained by making the same measurement with electrode 18 connected to 10, and electrode 16 to 12.

The values of $f_A$ and $f_B$ are useful for determining the coefficient of coupling $K$. Approximately $$K \approx (f_B - f_A)/f_A \approx (f_B - f_A)/f_B.$$

From the other measurements the value $L_1$ in FIGS. 4, 5, 6, 7 and 10 may be obtained as follows:

$$L_1 = \frac{1}{8\pi^2 f_s C_{12}}\left[\frac{1}{f_{C2} - f_s} - \frac{1}{f_{C1} - f_s}\right]$$

Since, when the electrodes 10, 12 16 and 18 are identical, $f_s$ is the center or midband frequency of the filter, $$C_1 = 1/(4\pi^2 f_s^2 L_1).$$

Thus $$C_m = C_1/K$$
$$\approx (C_1 f_A)/(f_B\mathbf{AB}I f_A).$$

It is also possible to determine $C_m$ otherwise. This is so because the frequencies $f_A$ and $f_B$ are respectively the result of a series circuit composed of $L_1$, $C_1$ and $C_m$, and $L_1$, $C_1$ and $-C_m$. Thus, $$2\pi f_A L_1 = \frac{1}{2\pi f_A \frac{C_1 C_m}{C_1 + C_m}}$$

Hence, $$C_m = C_1/(4\pi^2 f_A^2 L_1 C_1 - 1).$$

While embodiments of the invention have been described in detail, it will be obvious to those skilled in the art that the invention may be otherwise embodied within its spirit and scope.

What is claimed is:

1. A band-elimination filter network comprising in combination, input and output resonators each including a respective pair of electrodes, each pair sandwiching a respective portion of a piezoelectric crystal wafer therebetween, said resonators being linked by acoustic coupling through said wafer, said network being definable by an equivalent ladder network wherein said coupling is represented by an equivalent T circuit having three reactive branches equal to each other in the absolute magnitude of their respective reactances, and reactive means independent of said wafer connected between said resonators, the absolute magnitude of the reactance of said reactive means being equal within a preselected range to the absolute magnitude of the reactance of one of said branches.

2. Apparatus in accordance with claim 1 wherein said range equals ± 20 percent.

3. Apparatus in accordance with claim 1 wherein said reactive means consists solely of a capacitive element connected between one of said electrodes of said input resonator on one side of said wafer and the electrode of said output resonator on the other side of said wafer.

4. Apparatus in accordance with claim 3 wherein said range equals ± 20 percent.

5. Apparatus in accordance with claim 1 wherein said reactive means consists solely of an inductive element connected between two of said electrodes on the same side of said wafer.

6. Apparatus in accordance with claim 5 wherein said range equals ± 20 percent.

7. A band-elimination filter network comprising, in combination, input and output resonators each including a respective pair of electrodes each sandwiching a respective portion of a piezoelectric crystal wafer therebetween, said resonators being linked by acoustic coupling through said wafer, said network being definable by an equivalent ladder network wherein said coupling is represented by an equivalent T circuit having three reactive branches equal to each other in the absolute magnitude of their respective reactances, and reactive means independent of said wafer connected between said resonators, the characteristic frequency-attenuation plot of said filter exhibiting a single attenuation peak when the absolute magnitude of the reactance of said reactive means equals one of said respective reactances and exhibiting a double attenuation peak with the eliminated band therebetween when the absolute magnitude of the reactance of said reactive means falls within a given range of the absolute magnitude of one of said respective reactances.

8. Apparatus in accordance with claim 7 wherein said reactive means comprises a capacitive element connected between said resonators from opposite sides of said wafer.

9. Apparatus in accordance with claim 7 wherein said reactive means comprises an inductive element connected between said resonators on the same side of said wafer.

10. A band-elimination filter comprising, an acoustically excitable wafer having opposing faces, a first resonator including said wafer and a pair of opposing electrodes mounted on opposing faces of said wafer, a second resonator including said wafer and a second pair of opposing electrodes mounted on opposing faces of said wafer, said first and second resonators being acoustically coupled through said wafer when said wafer is excited for passing energy to a load, reactive means coupling an electrode of one of said resonators to an electrode in the other of said resonators, said resonators and said reactive means exhibiting characteristics of a bandpass filter when said reactive means have an absolute value outside a given range and said resonators and said reactive means exhibiting a band-elimination characteristic when said reactance means has an absolute reactance value lying in said given range, said reactive means having an absolute reactance value in said range, said resonators having respective equivalent motional capacitances $C_1$ and $C_2$ and being coupled to each other by a coefficient of coupling $K$, said range being equal to $\sqrt{C_1C_2}/K \pm 20\%$.

11. A band-elimination filter comprising in combination, an acoustically excitable piezoelectric wafer having opposing faces, a first resonator including said wafer and a pair of opposing electrodes mounted on opposing faces of said wafer, a second resonator including said wafer and a second pair of opposing electrodes mounted on opposing faces of said wafer, said first and second resonators being acoustically coupled through said wafer with a coefficient of coupling $K$ when said wafer is excited by passing energy to a load, and reactive means coupling an electrode of one of said resonators to an electrode in the other of said resonators, said resonators having respective equivalent motional capacitances $C_1$ and $C_2$, said reactive means having a reactance magnitude in the range of $\sqrt{C_1C_2}/K \pm 20\%$.

12. Apparatus in accordance with claim 11 wherein said reactive means consists of only a single capacitive element connected between an electrode of said first resonator and an electrode of said second resonator on opposite sides of said wafer.

13. Apparatus in accordance with claim 11 wherein said reactive means consists of only a single inductive element connected between an electrode of each of said resonators on the same side of said wafer.

14. A band-elimination filter network comprising in combination, input and output resonators each including a respective pair of electrodes each sandwiching a respective portion of a piezoelectric crystal wafer therebetween, said resonators being linked by acoustic coupling through said wafer, means for connecting a signal source across said input resonator, means including an impedance inverter network having a primary and a secondary circuit for connecting a load to said output resonator, said primary being connected across said output resonator and said secondary, oppositely poled, being connected across said load, and a capacitive element connected by way of said impedance inverter network between one of said electrodes of said input resonator and one of said electrodes of said output resonator on the same side of said wafer.

15. Apparatus in accordance with claim 14 wherein the equivalent motional capacitances of said resonators are $C_1$ and $C_2$, respectively, the coefficient of said coupling being $K$ and the magnitude of reactance of said capacitive element being within the range of $\sqrt{C_1C_2}/K \pm 20\%$.

* * * * *